United States Patent
Whetstone

(10) Patent No.: US 6,408,497 B1
(45) Date of Patent: Jun. 25, 2002

(54) FACE SEAL O-RING INSERTION TOOL

(75) Inventor: Merle A. Whetstone, Van Wert, OH (US)

(73) Assignee: Aeroquip Corporation, Maumee, OH (US)

( * ) Notice: Subject to any disclaimer, the term of this patent is extended or adjusted under 35 U.S.C. 154(b) by 0 days.

(21) Appl. No.: 09/426,170

(22) Filed: Oct. 22, 1999

Related U.S. Application Data

(62) Division of application No. 09/111,972, filed on Jul. 8, 1998, now Pat. No. 6,012,209.
(60) Provisional application No. 60/055,166, filed on Aug. 8, 1997.

(51) Int. Cl.$^7$ ................................................. B23P 19/02
(52) U.S. Cl. ........................................................ 29/235
(58) Field of Search ........................... 29/451, 235, 270, 29/283, 282, 278, 280, 809

(56) References Cited

U.S. PATENT DOCUMENTS

| | | |
|---|---|---|
| 3,145,463 A | 8/1964 | Hockett |
| 3,180,015 A | 4/1965 | Thompson et al. |
| 3,183,587 A | 5/1965 | Baskell |
| 3,553,817 A | 1/1971 | Lallak |
| 3,704,505 A | 12/1972 | Lacer, Jr. et al. |
| 3,981,066 A | 9/1976 | Calvert |
| 4,141,129 A | 2/1979 | Martini |
| 4,203,191 A | 5/1980 | Gibson, Sr. |
| 4,222,161 A | 9/1980 | Duval et al. |
| 4,571,804 A | 2/1986 | Grabler et al. |
| 4,845,822 A | 7/1989 | Hutson |
| 5,050,282 A | 9/1991 | Zannini |
| 5,138,752 A | 8/1992 | Tasner |

FOREIGN PATENT DOCUMENTS

| | | |
|---|---|---|
| DE | 24 44 896 A1 | 4/1975 |
| EP | 0 137 907 A2 | 4/1985 |
| JP | 59196133 | 11/1984 |
| JP | 04175578 | 6/1992 |
| JP | 07266221 | 10/1995 |
| NL | 1002857 | 10/1997 |

OTHER PUBLICATIONS

Birkicht B: "Flexible, Automatisierte Montage Von Sicherungsringen" Mechanische Verbindungstechnik, vol. 13, No. 4, Jan. 1, 1989, p. 16, XP000175377.

Warnecke G. et al; "Biegeschlaffe Teile Automatisiert Montiert" VDI Z, vol. 134, No. 12, Dec. 1, 1992, pp. 87–89, XP000328557.

G. Warnecke et al: "Industrieroboter montiert kleine O–Ringe automatisch" VDI–Zeitschrift, vol. 133, No. 8, Aug. 1991, Dusseldorf, pp. 35–38, XP000258824, see figures 3,6.

Automated Industrial Systems Inc. "Flexible and Dependable O–Ring and Seal Assembly" SB020040, Iss. 4/98; Rev. 0.0.

Primary Examiner—Robert C. Watson
(74) Attorney, Agent, or Firm—Emch, Schaffer, Schaub & Porcello Co., L.P.A.

(57) ABSTRACT

A tool for inserting a flexible O-ring in a connector having a recess including a lip. The tool includes a base. A ram is mounted on the base for pushing the O-ring toward the recess. A sleeve is mounted adjacent the ram. At least one chamfered edge is positioned on either the ram or the sleeve for engaging the O-ring to cause the O-ring to flex inwardly during pushing by the ram to allow the O-ring to pass the lip and enter the recess.

4 Claims, 17 Drawing Sheets

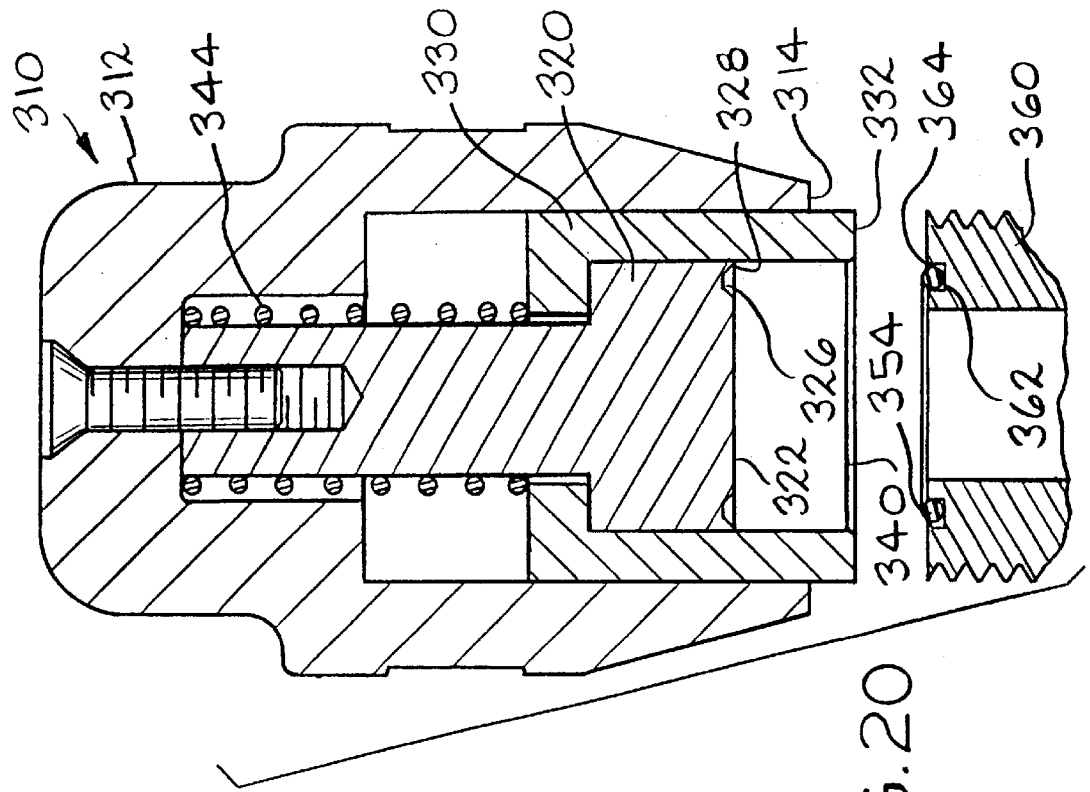
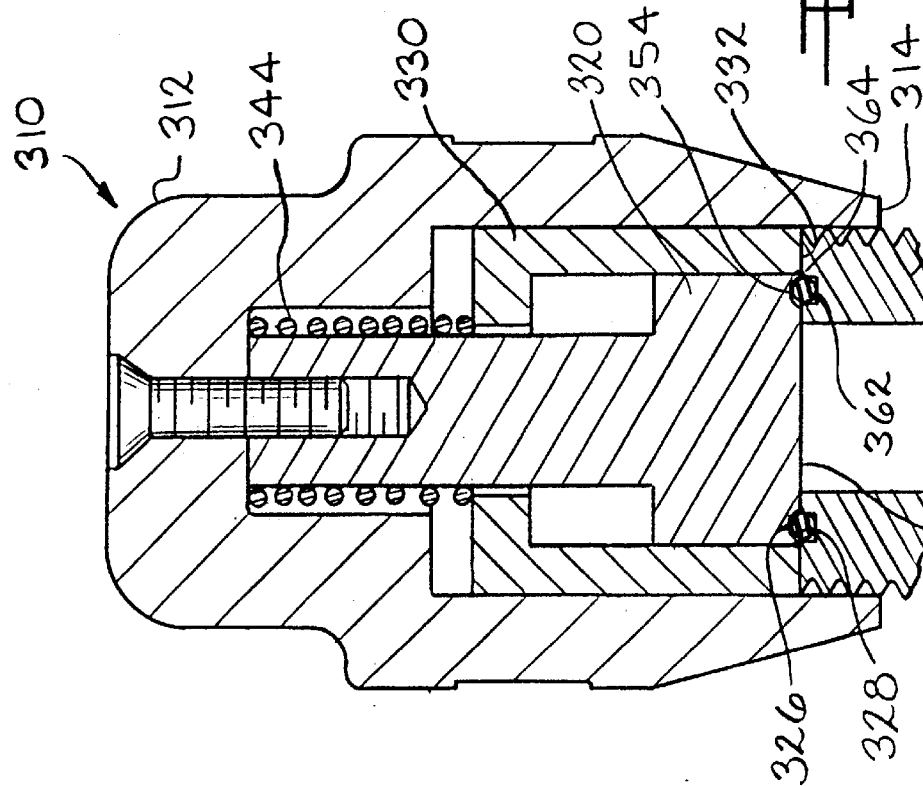
FIG. 20
FIG. 19

US 6,408,497 B1

FACE SEAL O-RING INSERTION TOOL

This application is a division of application Ser. No. 09/111,972 filed Jul. 8, 1998 now U.S. Pat. No. 6,012,209, which claims benefit to Provisional application No. 60/055/66 filed Aug. 8, 1997.

BACKGROUND OF THE INVENTION

The present invention relates to a face seal O-ring insertion tool. More specifically, the invention is directed to a tool that can be used to insert an O-ring in a half dovetail recess of an industrial connector, such as a fitting, an adaptor, or a coupling.

O-rings are usually round, flexible seals that are made of an elastomeric material. O-rings can be positioned in recesses defined by connectors in order to prevent leakage of fluid. In the past, O-rings fell out of the recesses during shipment of the connectors because the recesses were not designed to maintain the O-rings within the recesses.

Recently, the recesses, which are also known as glands or grooves, have been redesigned to include a lip in order to form a "half dovetail" configuration. This new configuration makes it difficult to dislodge the O-ring once it is inserted in the recess.

It has been found that it is difficult to insert an O-ring in the half dovetail groove. Therefore, there is a need for a tool to insert an O-ring in a half dovetail recess. The present invention satisfies this need.

SUMMARY OF THE INVENTION

The present invention is directed to a tool for inserting a flexible O-ring in a connector having a recess including a lip. The tool includes a base. A ram is mounted on the base for pushing the O-ring toward the recess. A sleeve is mounted adjacent the ram. At least one chamfered edge is positioned on either the ram or the sleeve for engaging the O-ring to cause the O-ring to flex inwardly during pushing by the ram to allow the O-ring to pass the lip and enter the recess.

The primary object of the present invention is to provide a face seal O-ring insertion tool that can be used to insert an O-ring in a half dovetail recess of a connector.

Other objects and advantages of the present invention shall become apparent to those skilled in the art upon a review of the following detailed description of the preferred embodiments and the accompanying drawings.

BRIEF DESCRIPTION OF THE DRAWINGS

FIG. 19 is a view similar to the view of FIG. 18 showing the tool positioning the O-ring in the recess;

FIG. 20 is a view similar to the view of FIG. 19 showing the tool being removed from the connector and the O-ring positioned in the recess of the connector;

DETAILED DESCRIPTION OF THE PREFERRED EMBODIMENTS

Figure 1:
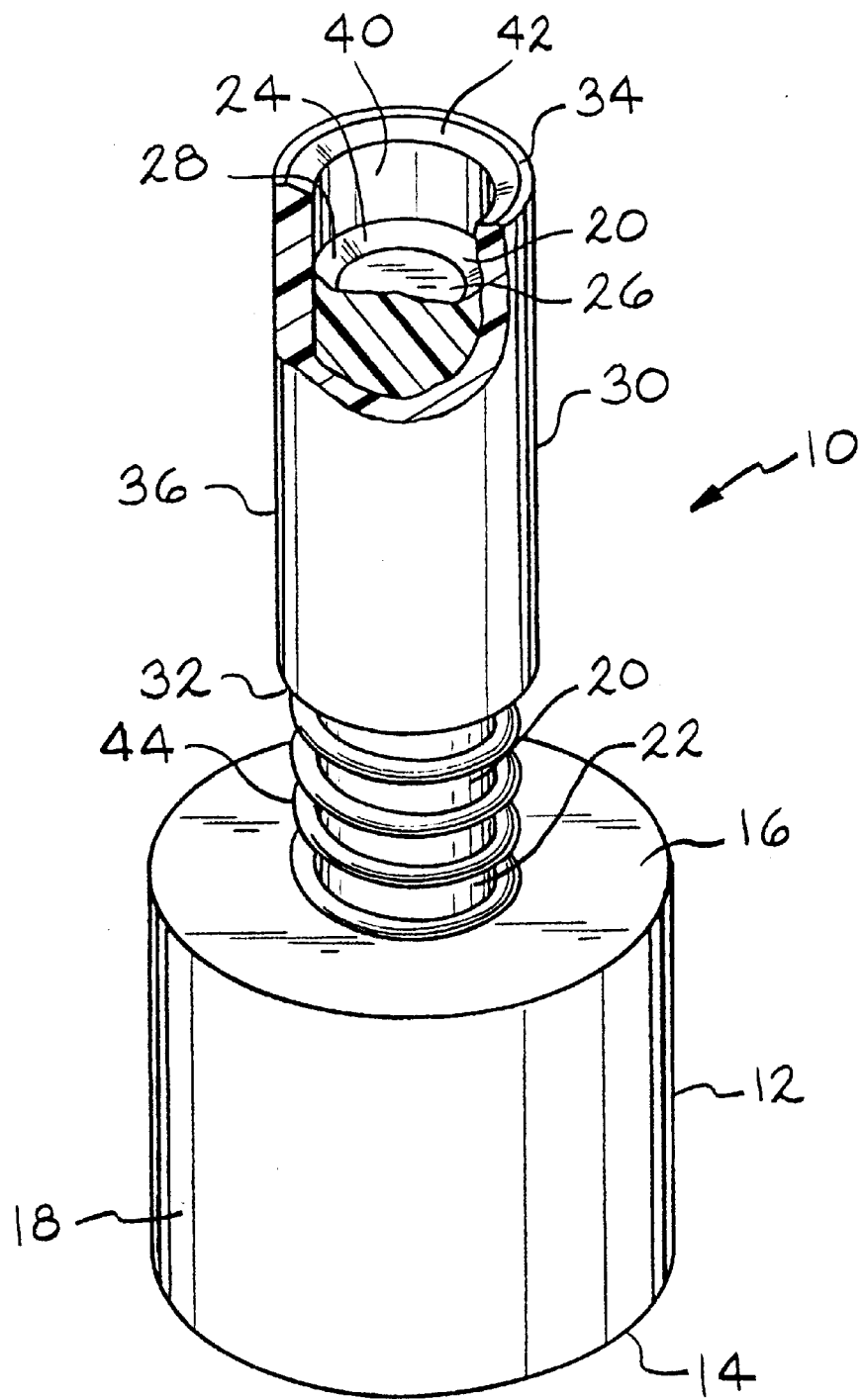
FIG. 1 is a perspective view of a face seal O-ring insertion tool according to the present invention with a portion of the sleeve cut away to reveal the interior of the sleeve.

The preferred embodiments and best mode of the present invention will now be described with reference being made to the drawings. Referring to FIGS. 1–5, a first embodiment of the face seal O-ring insertion tool according to the present invention is shown. In the drawings, the first embodiment tool is indicated generally by the reference number "10".

Referring to FIG. 1, the tool 10 includes a base 12 having a first surface 14, a second surface 16 and a side surface 18 that extends between the first and second surfaces. In a preferred embodiment, the side surface 18 has a substantially cylindrical configuration. However, it should be understood that the side surface can be comprised of a variety of shapes depending on the application.

Figure 2:
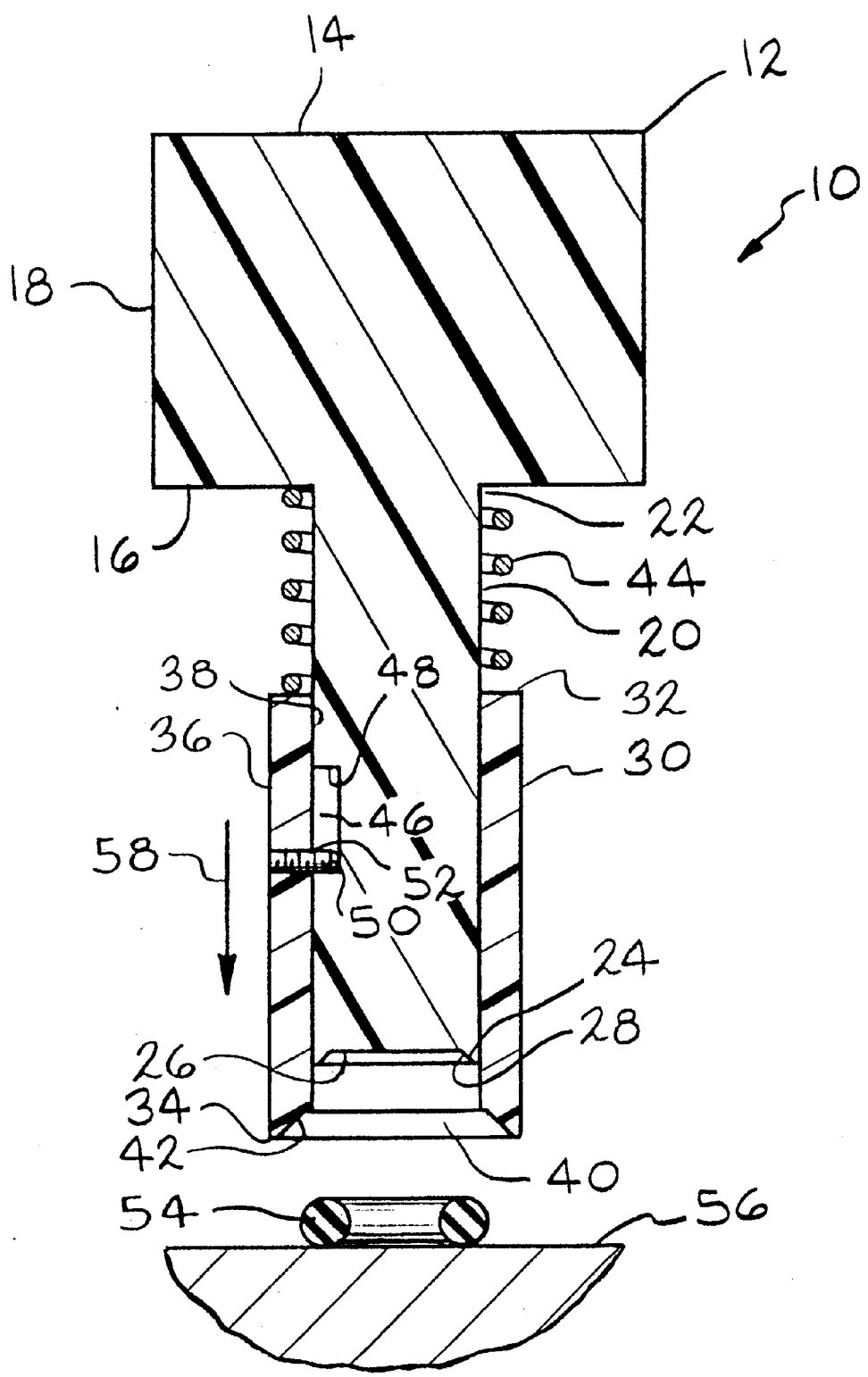
FIG. 2 is a cross-sectional view taken through the center of the insertion tool shown in FIG. 1 in which the tool is being placed over an O-ring.

Referring to FIGS. 1 and 2, the tool 10 includes a ram 20 extending outwardly from the second surface 16. In a preferred embodiment, the ram 20 has a substantially cylindrical configuration. The ram 20 includes a first end 22 and a second end 24. As shown in FIG. 2, the first end 22 is adjacent the second surface 16 of the base 12. The second end 24 defines an O-ring receiving cavity 26 having a chamfered edge 28. The O-ring cavity 26 is adapted and sized to receive a particular size O-ring.

Referring to FIGS. 1 and 2, the tool 10 includes a sleeve 30 including a first edge 32, a second edge 34 and a sleeve wall 36 extending between the first and second edges. In a preferred embodiment, the sleeve wall. 36 has a substantially cylindrical configuration. The sleeve 30 includes an interior surface 38 that has a substantially cylindrical configuration that is adapted and sized to receive the ram 20. The second edge 34 defines an opening 40. A second chamfered edge 42 is defined by the second edge 34 adjacent the opening 40.

Referring to FIGS. 1 and 2, the tool 10 includes a coiled spring 44 positioned between the second surface 16 of the base 12 and the first edge 32 of the sleeve 30. The spring 44 urges the sleeve 30 away from the base 12. However, the spring 44 can be compressed to allow the sleeve 30 to move toward the base 12. In order to control such movement, the ram 20 defines a projection slot 46 that includes a first slot end 48 and a second slot end 50. The slot 46 is adapted and sized to receive a slot projection 52 that is fixedly attached to the interior surface 38 of the sleeve 30. The slot projection 52 and the slot 46 cooperate to limit the travel of the sleeve 30 in the space defined by the first and second slot ends 48 and 50.

Figure 3:
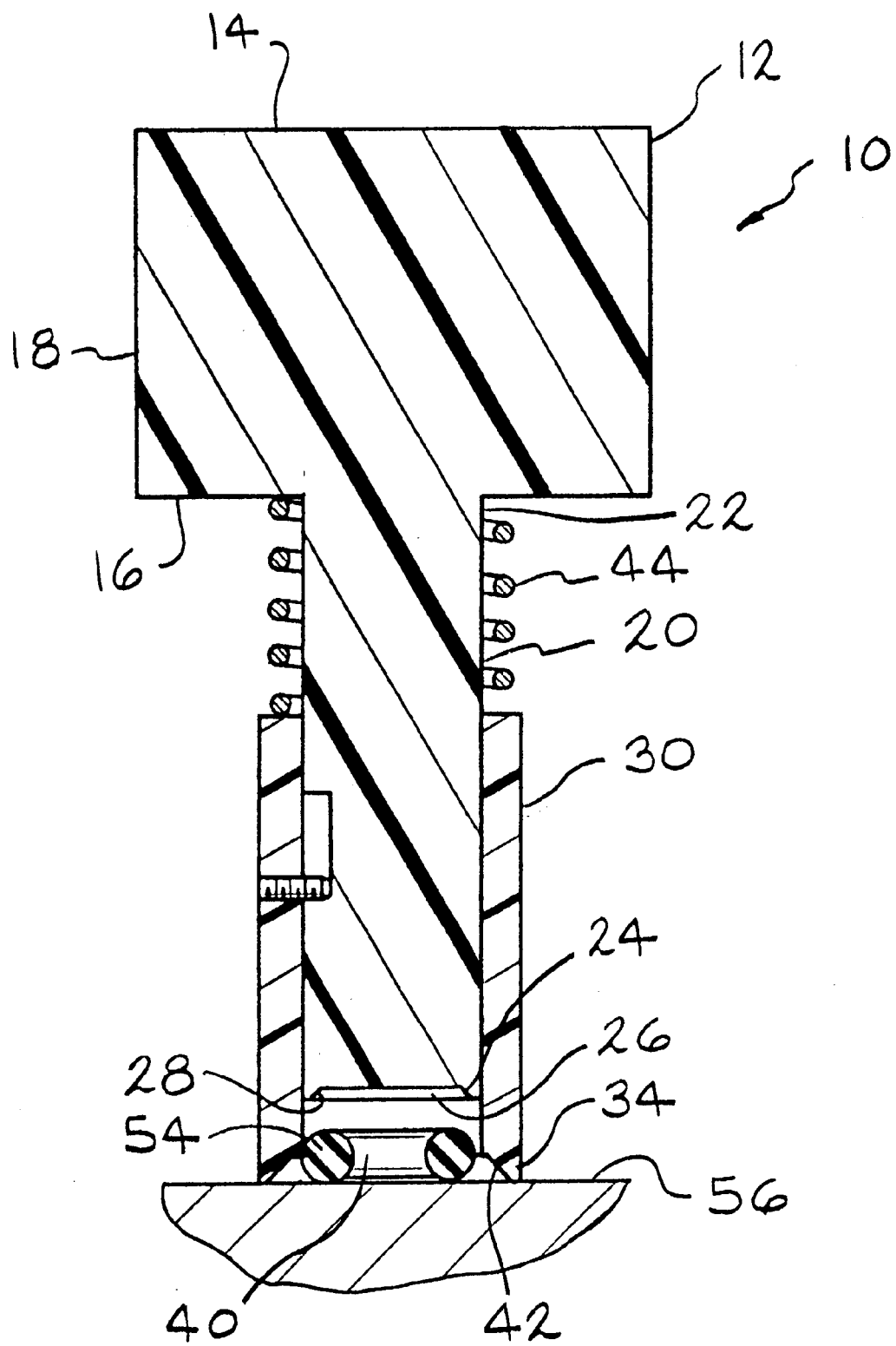
FIG. 3 is a view similar to the view of FIG. 2 showing the tool receiving the O-ring.

Referring to FIGS. 2–5, the operation of the tool 10 will be described. As shown in FIGS. 2 and 3, a flexible O-ring 54 comprised of an elastomeric material is positioned on a work surface 56. The tool 10 is positioned above the O-ring 54 so that the opening 40 of the second edge 34 is in alignment with the O-ring. The tool 10 is then moved in the direction indicated by the arrow 58 in FIG. 2 until the O-ring 54 contacts the second chamfered edge 42 of the second edge 34, which is adapted and sized to snugly engage the flexible O-ring. This allows the tool 10 to lift the O-ring 54 without the O-ring falling out of the opening 40.

Figure 4:
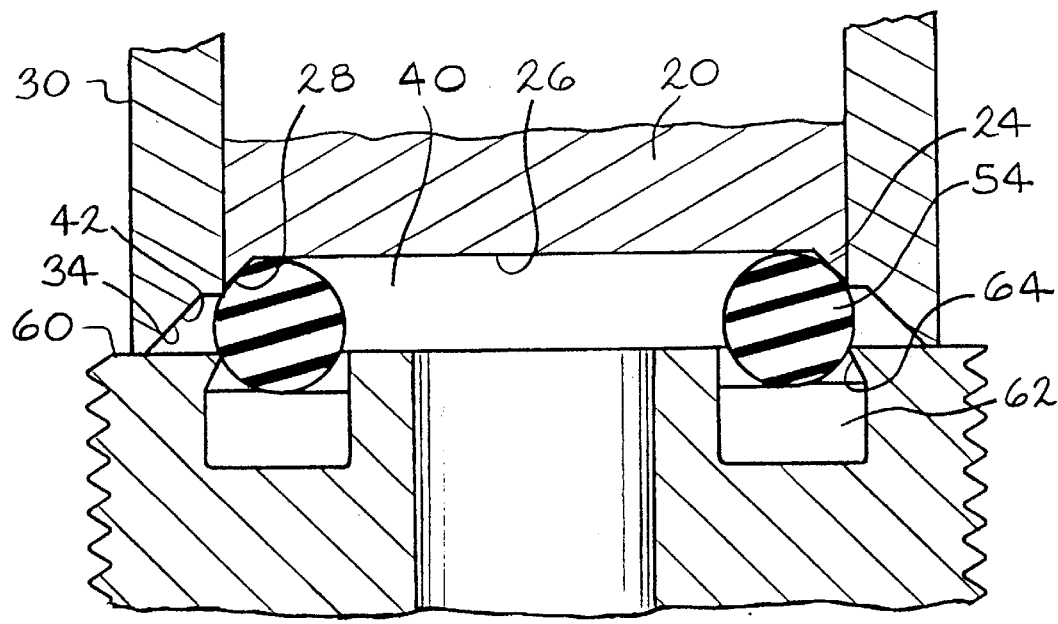
FIG. 4 is a detailed cross-sectional view showing the tool of FIG. 1 positioning an O-ring adjacent a connector defining a half dovetail recess.
Figure 5:
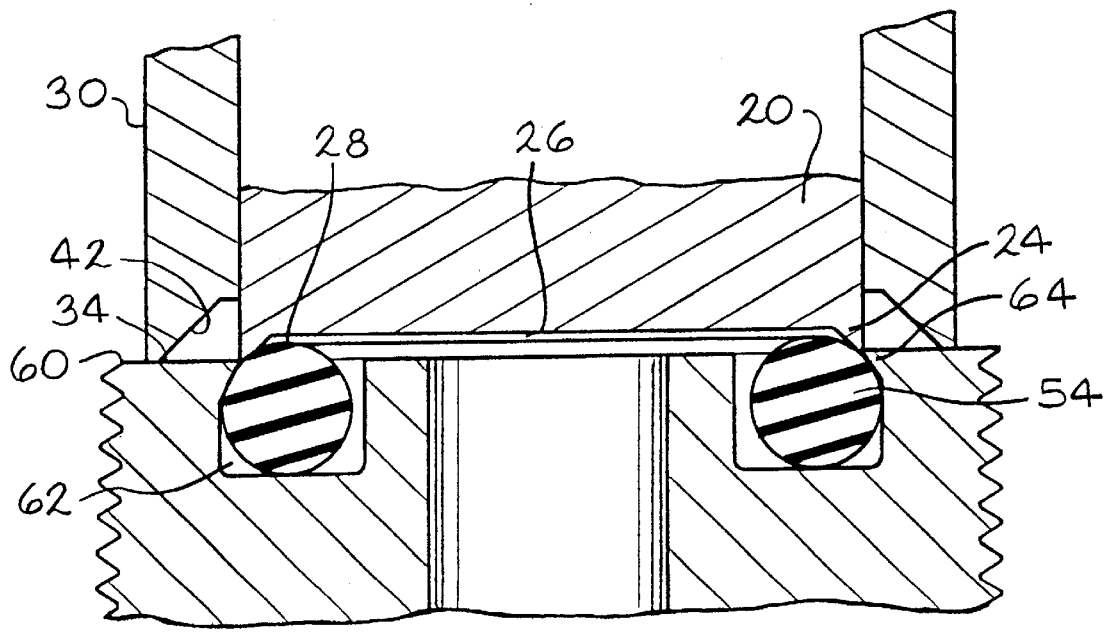
FIG. 5 is a view similar to the view of FIG. 4. showing the tool positioning the O-ring in the recess.

Referring to FIGS. 4 and 5, the second edge 34 of the sleeve 30 is positioned adjacent a connector 60 that defines a half dovetail recess 62. As shown in FIG. 4, the recess 62 includes an inwardly extending lip 64. The O-ring 54 is positioned in the recess 62 by engaging and pushing the first surface 14 of the base 12 toward the connector 60. This causes the second end 24 of the ram 20 to push the O-ring 54 into the recess 62. During pushing, the chamfered edge 28 of the ram 20 engages the O-ring 54 to cause the O-ring to flex inwardly to allow the O-ring to pass the lip 64 of the recess 62. It has been found that the tool 10 allows for constant forces to be applied to the O-ring 54 during pushing. These forces allow for the even and complete insertion of the O-ring 54 in the recess 62 as shown in FIG. 5. After the O-ring 54 has been inserted in the recess 62, the tool 10 is withdrawn from the connector 60.

Figure 6:
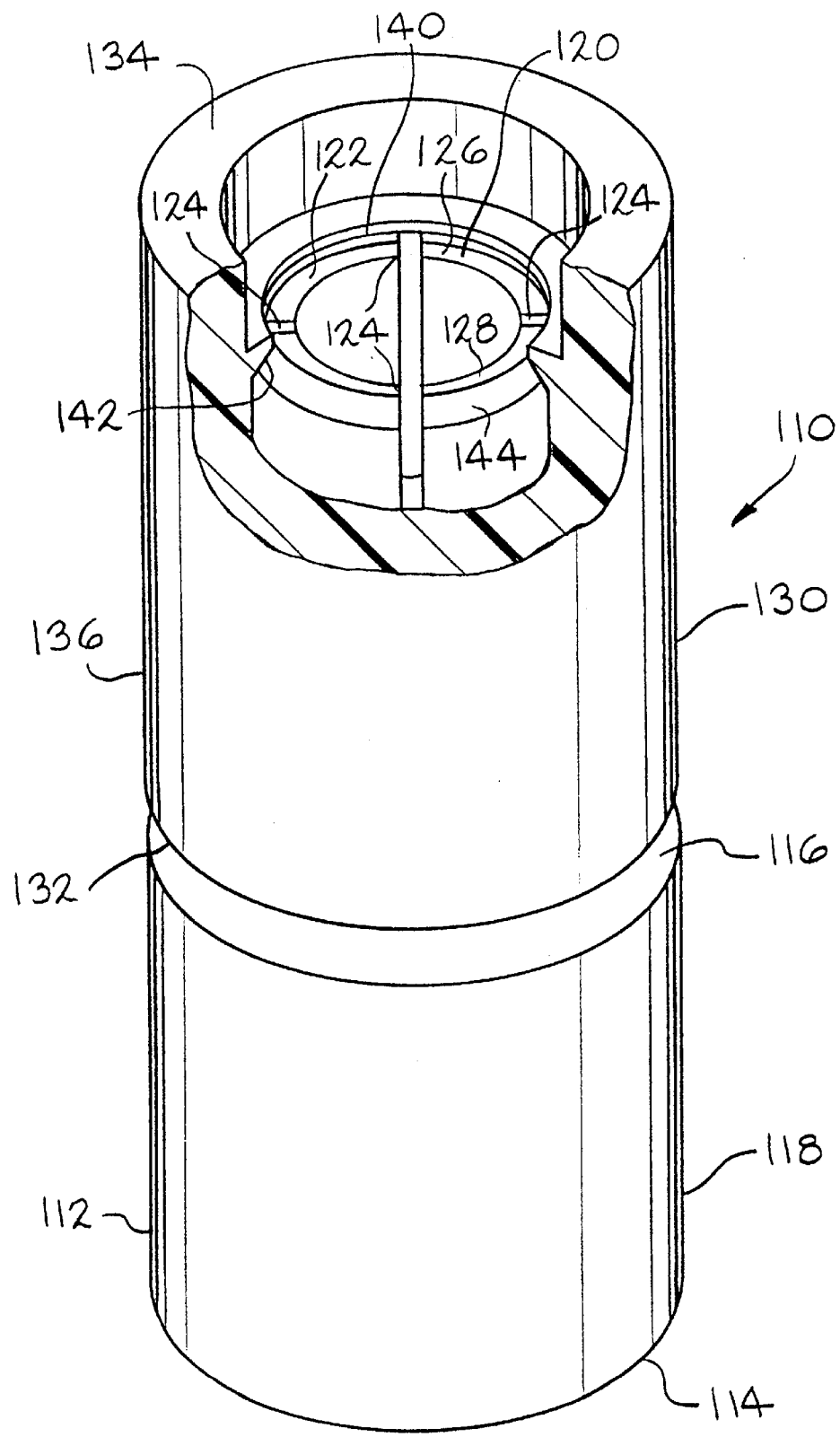
FIG. 6 is a perspective view of a second embodiment according to the present invention with a portion of the sleeve cut away to reveal the interior of the sleeve.
Figure 7:
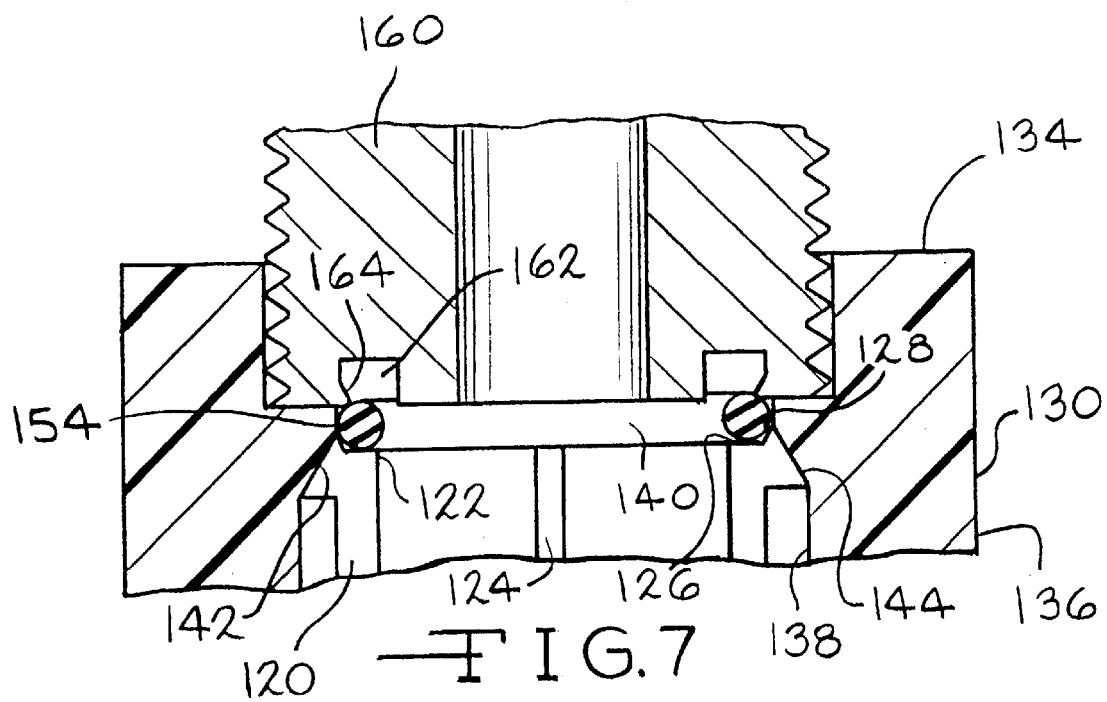
FIG. 7 is a detailed cross-sectional view showing the tool of FIG. 6 positioning an O-ring adjacent a connector defining a half dovetail recess.
Figure 8:
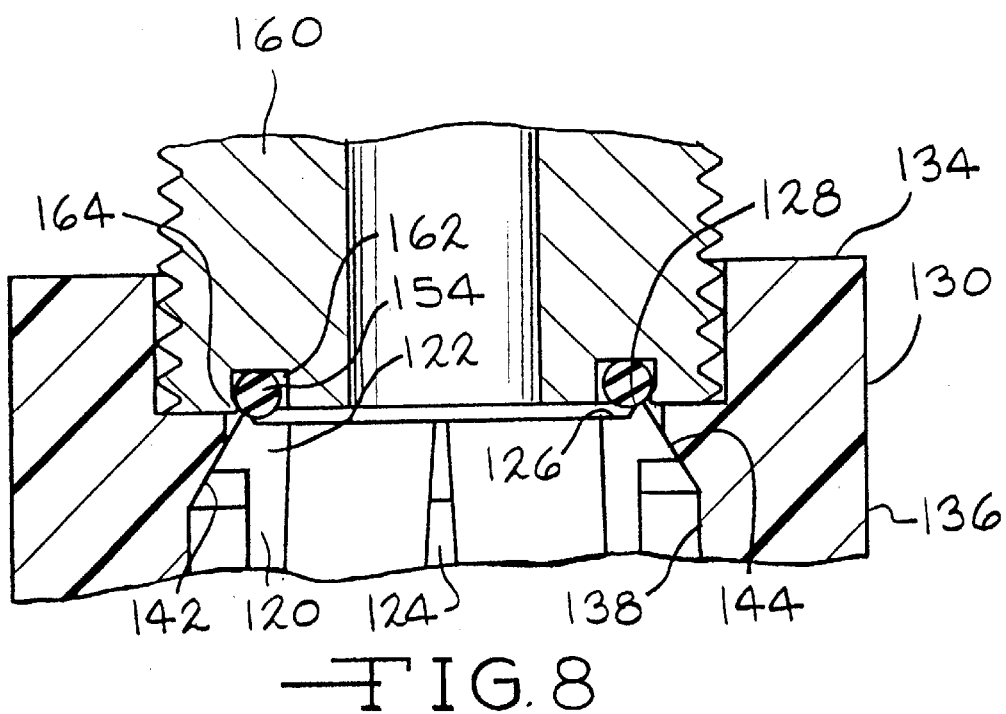
FIG. 8 is a view similar to the view of FIG. 7 showing the tool inserting the O-ring in the recess.

Referring to FIGS. 6–8, a second embodiment tool is shown. In the drawings, the second embodiment tool is indicated generally by the reference number "110". Referring to FIG. 6, the tool 110 includes a base 112 having a first surface 114, a second surface 116 and a substantially cylindrical side surface 118. A ram 120 extends outwardly from the second surface 116. The ram 120 includes a first end (not shown) adjacent the second surface 116 of the base 112 and a second end 122 defining at least two slots 124. In a preferred embodiment, the tool 110 includes four slots 124. However, the number of slots 124 can vary depending on the application of the tool 110. The slots 124 allow the second end 122 of the ram 120 to be semi-flexible during use. As shown in FIGS. 6 and 7, the second end 122 defines an O-ring receiving cavity 126 having a chamfered edge 128. The O-ring cavity 126 and the chamfered edge 128 are adapted and sized to receive a particular size O-ring.

Referring to FIGS. 6 and 7, the tool 110 includes a sleeve 130 movably mounted on the ram 120. The sleeve 130 has a first edge 132, a second edge 134 and a substantially cylindrical sleeve wall 136. The sleeve 130 includes an interior surface 138 that is adapted and sized to receive the ram 120. The second edge 134 of the sleeve 130 defines an opening 140. An inclined surface 142 is defined by the interior surface 138 of the sleeve 130 adjacent the opening 140. The inclined surface 142 is adapted and sized to snugly engage at least two ram surfaces 144 defined by the ram 120 adjacent the second end 122. In a preferred embodiment, the tool 110 includes four ram surfaces 144.

Referring to FIGS. 7 and 8, the operation of the tool 110 will be described. The first surface 114 of the base 112 of the tool 110 is positioned, for example, on a work surface. As shown in FIG. 7, an O-ring 154 is positioned in the O-ring cavity 126 of the ram 120. A connector 160 defining a half dovetail recess 162 that includes an inwardly extending lip 164 is positioned adjacent the second edge 134 of the sleeve 130. The connector 160 is then pushed into the sleeve 130. This causes the second end 122 of the ram 120 to engage the O-ring 154. As shown in FIG. 8, contact between the ram surfaces 144 and the inclined surface 142 of the sleeve 130 causes the second end 122 of the ram 120 to flex inwardly. This inward movement causes the chamfered edge 128 of the ram 120 to engage the O-ring 154 to cause the O-ring to flex inwardly and move past the lip 164 into the recess 162 as shown in FIG. 8. The connector 160 is then twisted in relation to the tool 110. The connector 160 is then withdrawn from the tool 110. After withdrawal of the tool 110, the O-ring 154 is firmly and evenly inserted in the recess 162.

Figure 9:
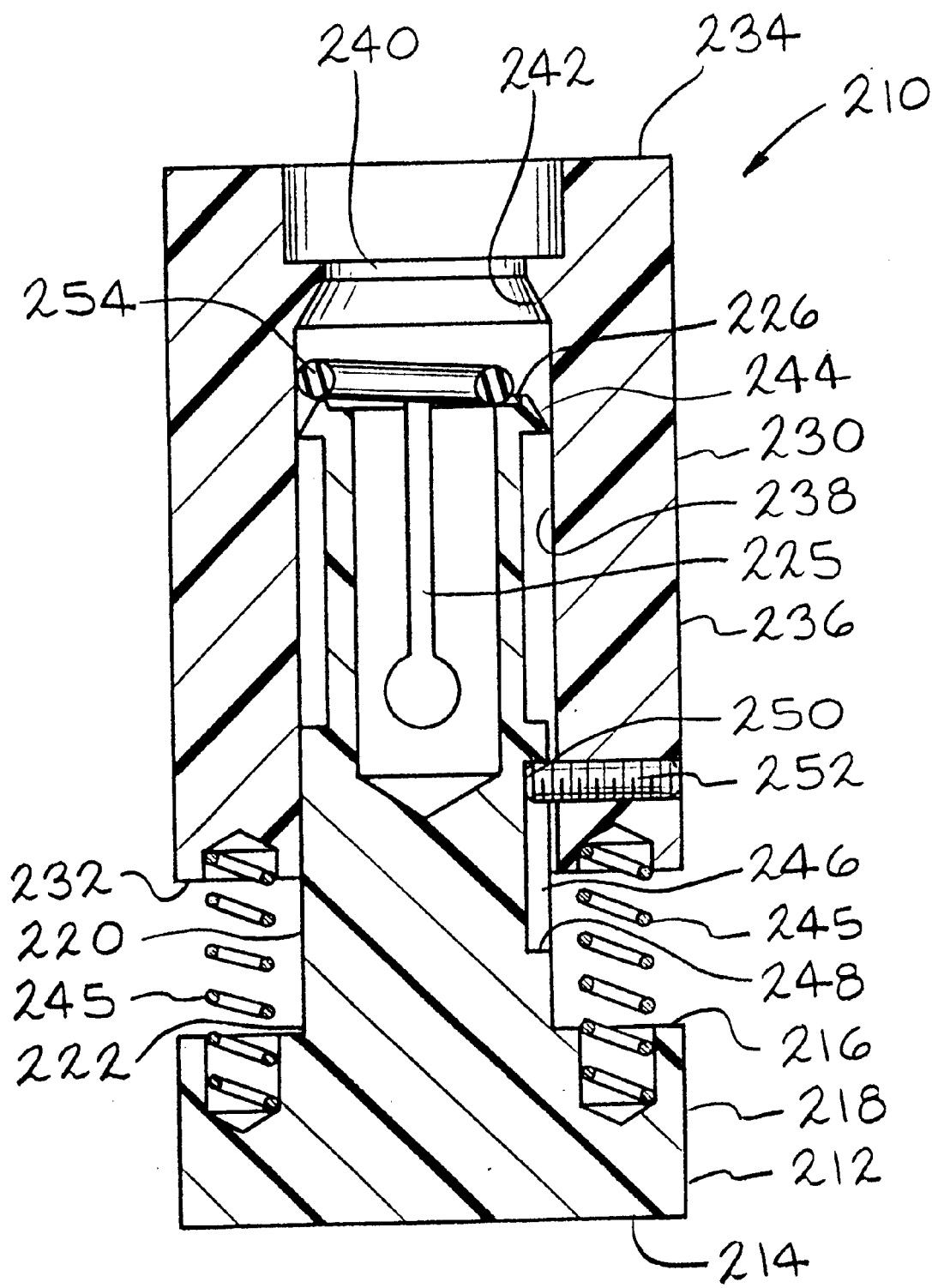
FIG. 9 is a cross-sectional view taken through the center of a third embodiment according to the present invention.
Figure 10:
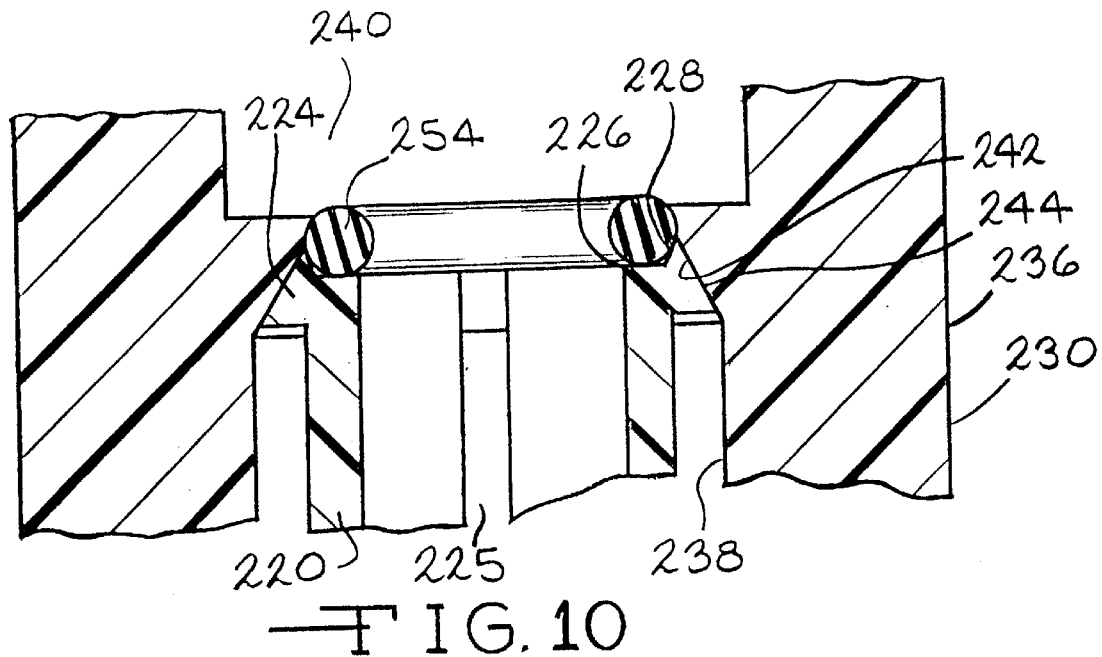
FIG. 10 is a detailed cross-sectional view showing an O-ring positioned on the ram of the tool shown in FIG. 9.

Referring to FIGS. 9–13, a third embodiment tool is shown. In the drawings, the third embodiment tool is indicated generally by the reference number "210". Referring to FIG. 9, the tool 210 includes a base 212 having a first surface 214, a second surface 216 and a substantially cylindrical side surface 216. A ram 220 extends outwardly from the second surface 216. The ram 220 includes a first end 222 adjacent the second surface 216 of the base 212 and a second end 224 defining at least two slots 225. In a preferred embodiment, the tool 210 includes four slots 225. However, the number of slots 225 can vary depending on the application of the tool 210. The slots 225 allow the second end 224 of the ram 220 to be semi-flexible during use. As shown in FIGS. 9 and 10, the second end 224 defines an O-ring cavity 226 having a chamfered edge 228. The O-ring cavity 226 and the chamfered edge 228 are adapted and sized to receive a particular size O-ring.

Referring to FIG. 9, the tool 210 includes a sleeve 230 having a first edge 232, a second edge 234 and a substantially cylindrical sleeve wall 236. The sleeve 230 includes an interior surface 238 that is adapted and sized to receive the ram 220. The second edge 234 of the sleeve 230 defines an opening 240. An inclined surface 242 is defined by the interior surface 238 of the sleeve 230 adjacent the opening 240. The inclined surface 242 is adapted and sized to snugly engage the ram surfaces 244 defined by the ram 220 adjacent the second end 224.

As shown in FIG. 9, the tool 210 includes at least one coiled spring 245 positioned between the second surface 216 of the base 212 and the first edge 232 of the sleeve 230. In a preferred embodiment, the tool 210 includes two opposed coiled springs 245. The springs 245 urge the sleeve 230 away from the base 212. However, the springs 245 can be compressed to allows the sleeve 230 to move toward the base 212. In order to control such movement, the ram 220 defines a slot 246 that includes a first slot end 248 and a second slot end 250. The slot 246 is adapted and sized to receive a slot projection 252 that is fixedly attached to the interior surface 238 of the sleeve 230. The slot projection 252 and the slot 246 cooperate to limit the travel of the sleeve 230 in the space defined by the first and second slot ends 248 and 250.

Figure 11:
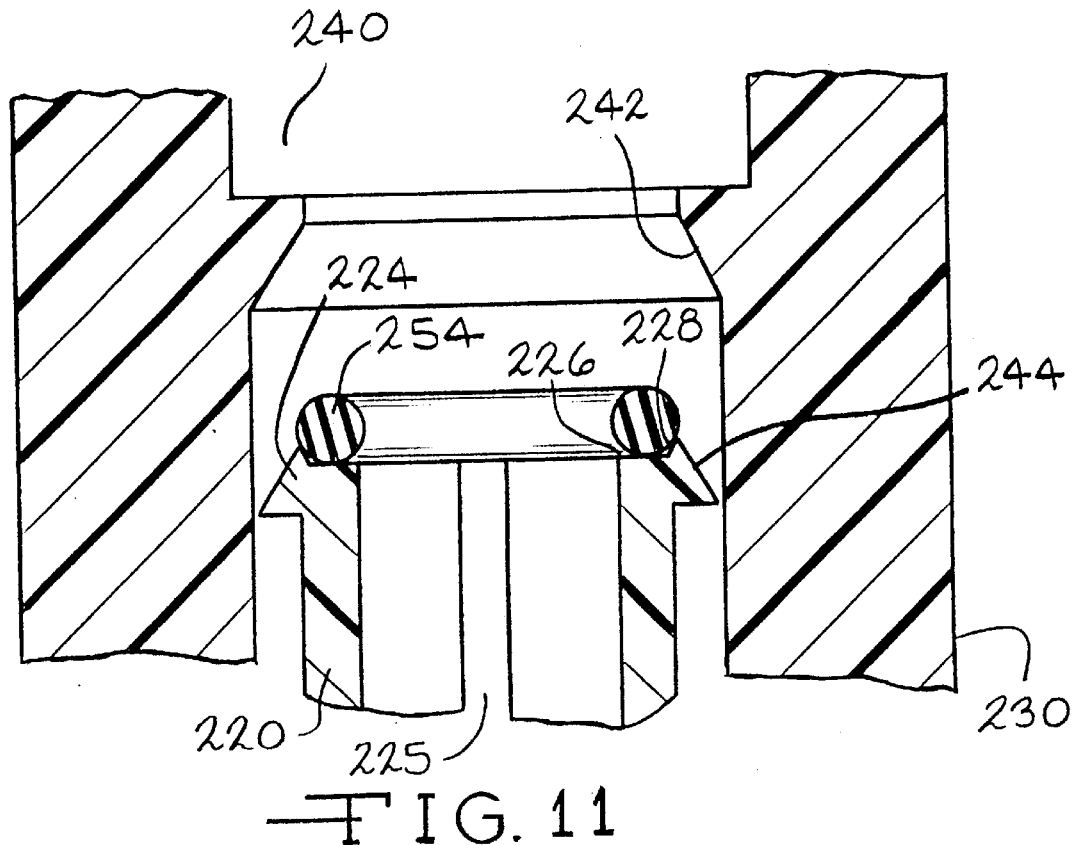
FIG. 11 is a view similar to the view of FIG. 10 showing the O-ring being centered on the ram.
Figure 12:
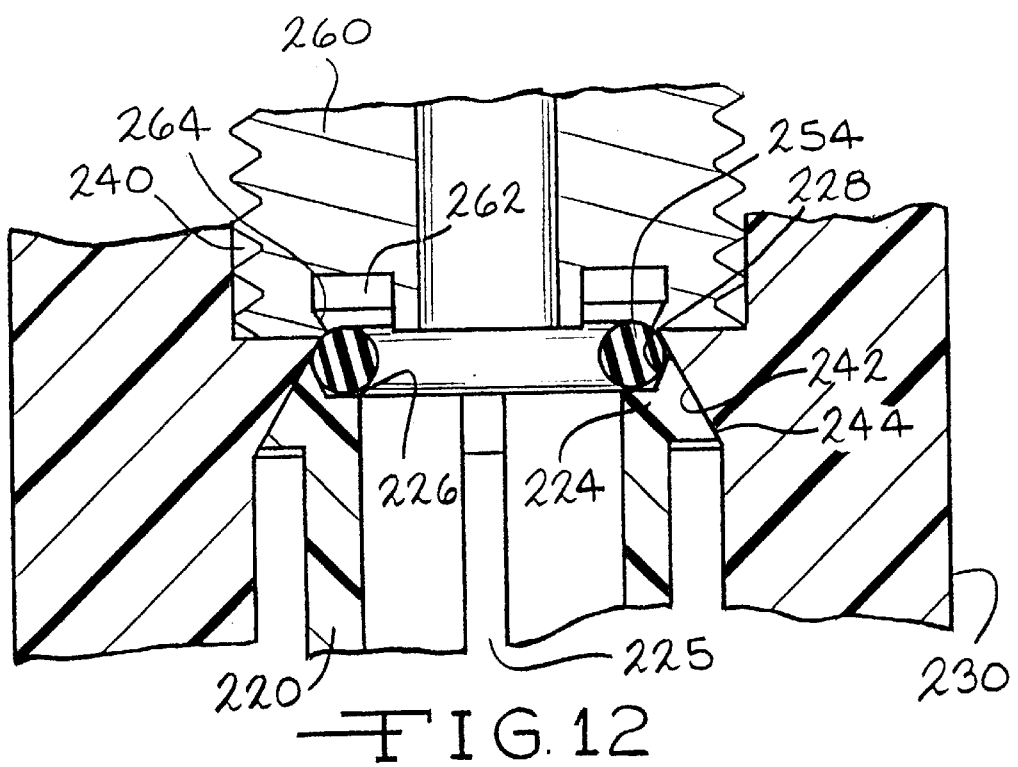
FIG. 12 is a view similar to the view of FIG. 10 showing the tool with the O-ring being positioned adjacent a connector defining a half dovetail recess.
Figure 13:
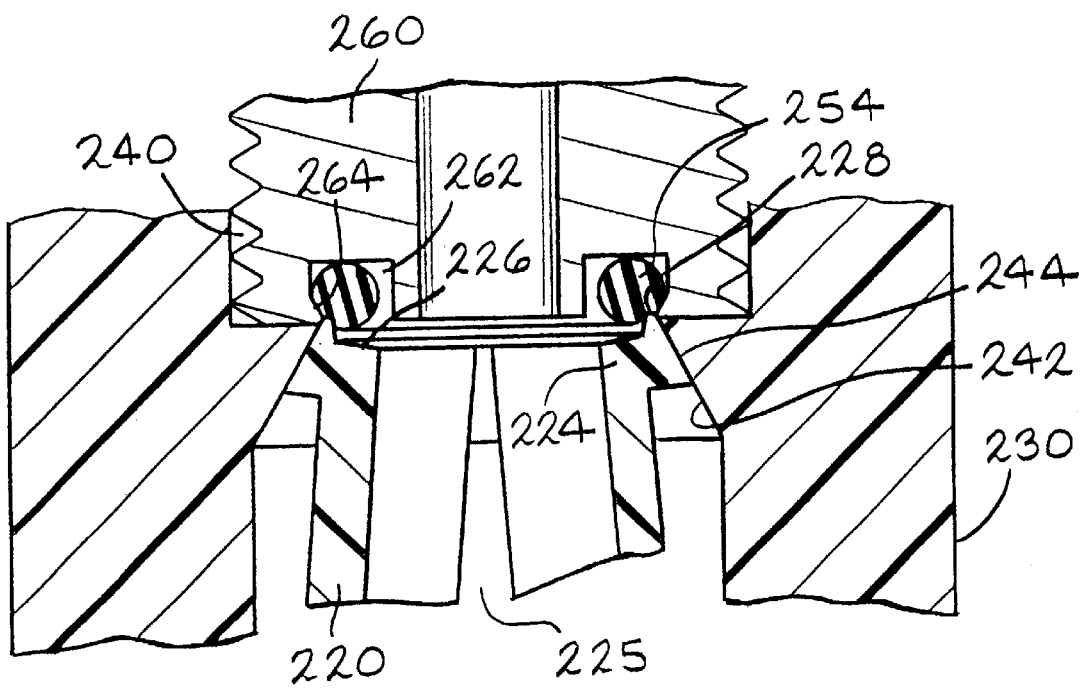
FIG. 13 is a view similar to the view of FIG. 10 showing the tool inserting the O-ring in the half dovetail recess of the connector.

Referring to FIGS. 10–13, the operation of the tool 210 will be described. The first surface 214 of the base 212 of the tool 210 is positioned, for example, on a work surface. As shown in FIG. 10, an O-ring 254 is positioned in the O-ring cavity 226 while the second end 224 of the ram 220 is positioned adjacent the opening 240 defined by the sleeve 230. As shown in FIG. 11, the ram 220 is then allowed to be withdrawn from the opening 240. As shown in FIG. 12, a connector 260 defining a half dovetail recess 262 that includes an inwardly extending lip 264 is positioned adjacent the sleeve 230. The connector 260 is then pushed into the sleeve 130. This causes the second end 224 of the ram 220 to engage the O-ring 254. As shown in FIGS. 12 and 13, contact between the ram surfaces 244 and the inclined surface 242 of the sleeve 230 causes the second end 224 of the ram 220 to flex inwardly. This inward movement causes the chamfered edge 228 of the ram 220 to engage the O-ring 254 to cause the O-ring to flex inwardly and move past the lip 264 into the recess 262 as shown in FIG. 13. The connector 260 is then twisted in relation to the tool 210. The connector 260 is then withdrawn from the tool 210. After withdrawal of the tool 210, the O-ring 254 is firmly and evenly inserted in the recess 262.

Figure 14:
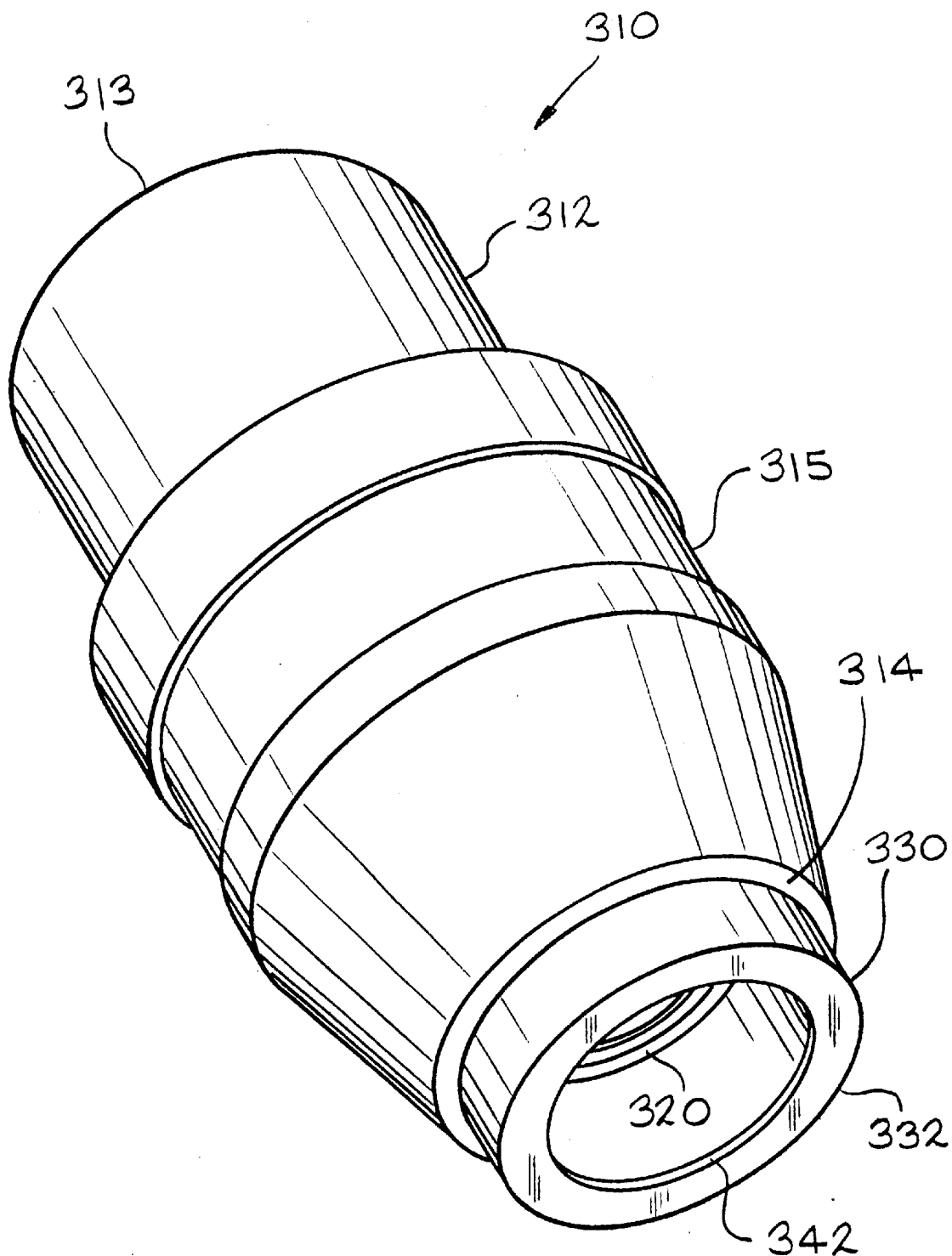
FIG. 14 is perspective view of a fourth embodiment according to the present invention.
Figure 15:
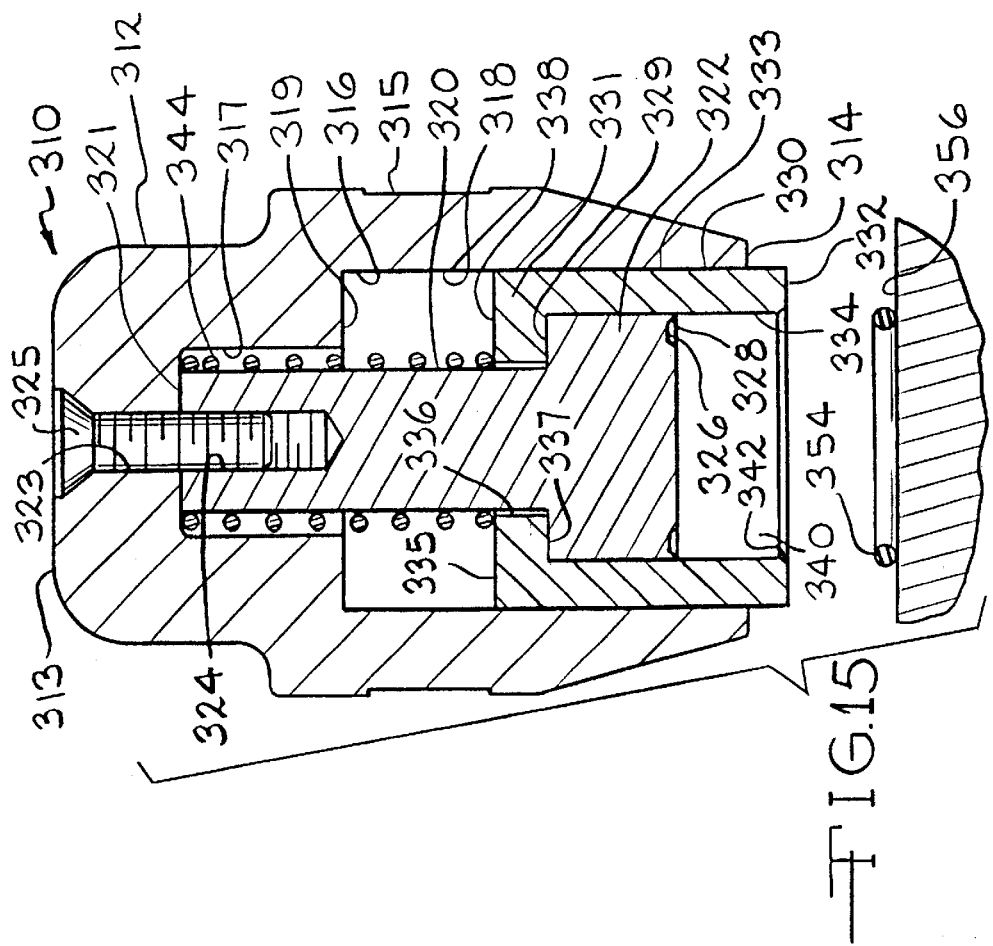
FIG. 15 is a detailed cross-sectional view showing the tool of FIG. 14 in which the tool is being placed over an O-ring.
Figure 18:
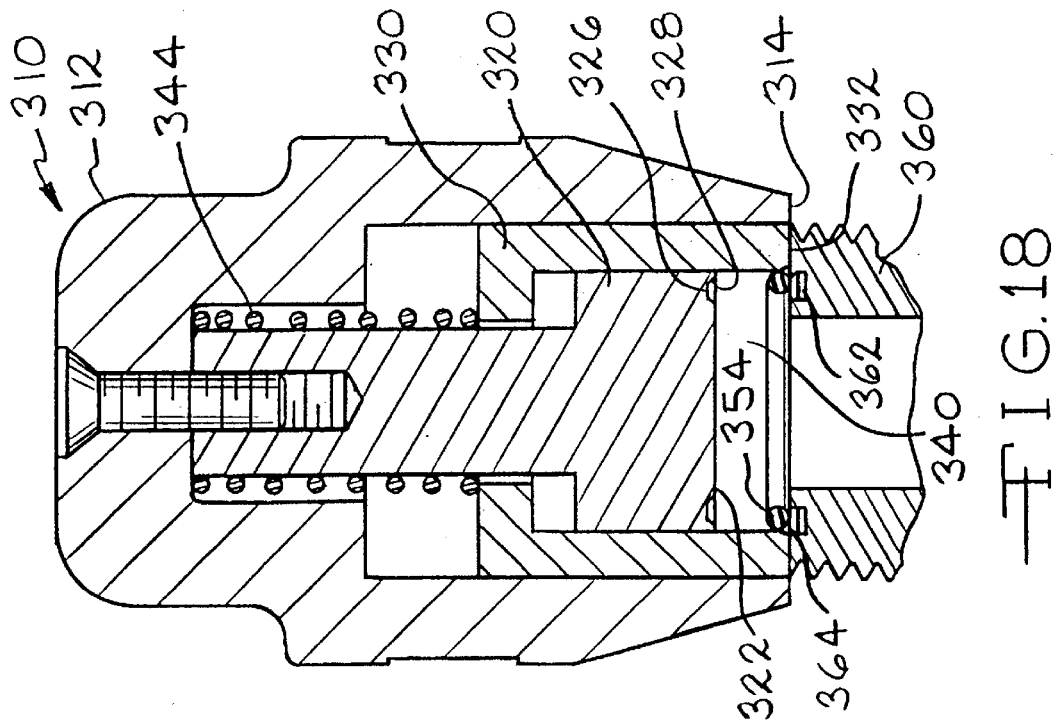
FIG. 18 is a view similar to the view of FIG. 17 showing the tool in contact with the connector and the ram moving toward the O-ring.
Figure 17:
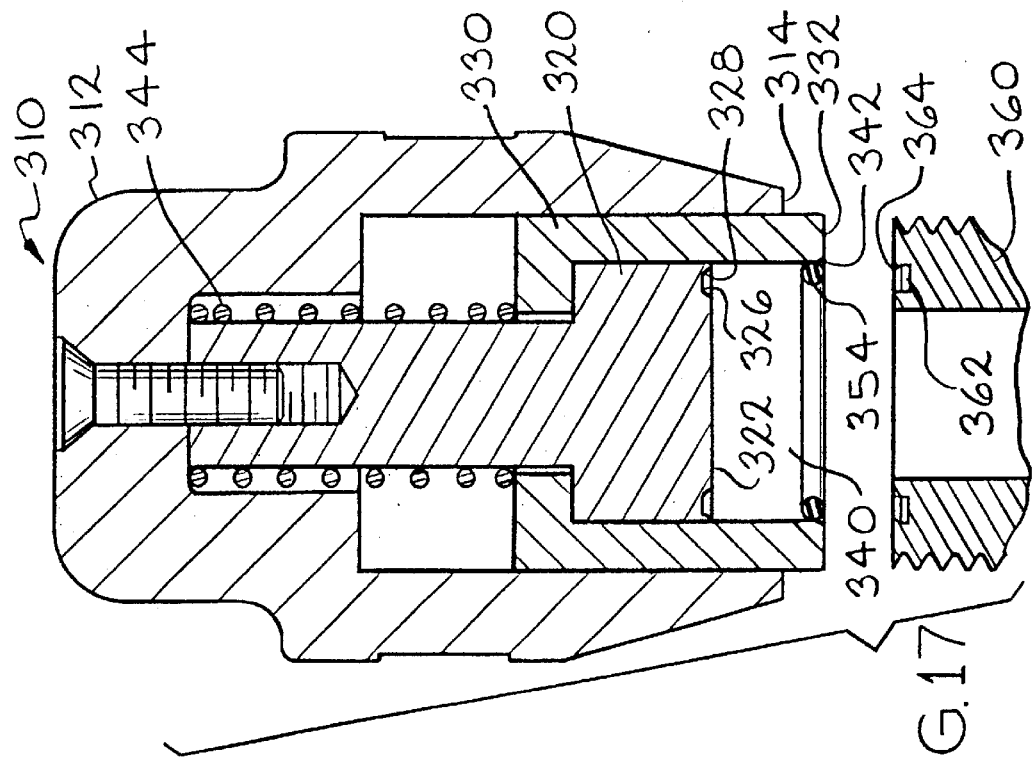
FIG. 17 is a detailed cross-section view showing the tool of FIG. 14 positioning an O-ring adjacent a connector defining a half dovetail recess.
Figure 21:
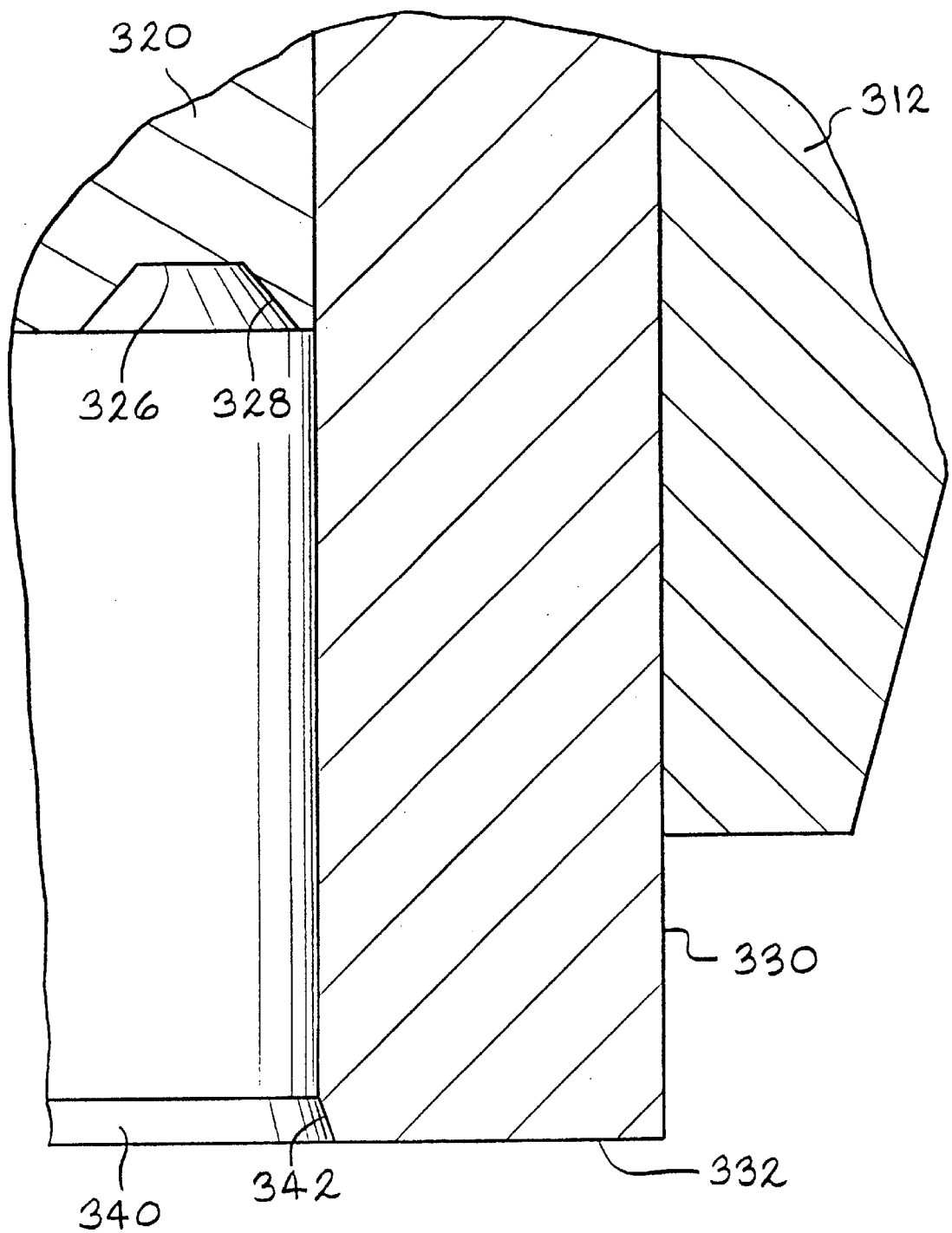
FIG. 21 is a detailed cross-sectional view of the body, sleeve and ram of the fourth embodiment tool shown in FIG. 14.

Referring to FIGS. 14–21, a fourth embodiment tool is shown. In the drawings, the fourth embodiment tool is indicated generally by the reference number "310". Referring to FIGS. 14 and 15, the tool 310 includes a base 312 having a first surface 313, a second surface 314 and a side surface 315 that extends between the first and second surfaces. In a preferred embodiment, the side surface 315 has a substantially cylindrical configuration. However, it should be understood that the side surface can be comprised of a variety of shapes depending on the application. As shown in FIG. 15, the base 312 includes an interior surface 316 that defines a first base cavity 317 having a substantially cylindrical configuration and a second base cavity 318 that also has a substantially cylindrical configuration. In a preferred embodiment, the second base cavity 318 has a larger diameter than the first base cavity 317. An annular shoulder 319 is defined by the interior surface 316 of the base 312 between the first and second base cavities 317 and 318.

Still referring to FIGS. 14 and 15, the tool 310 includes a ram 320 having a first end 321 and a second end 322. As shown in FIG. 15, the first end 321 is positioned in the first base cavity 317 of the base 312 and the second end 322 is positioned in the second base cavity 318. As shown in FIG. 15, the base 312 defines a base opening 323 that extends from the first surface 313 to the first base cavity 317. The first end 321 of the ram 320 defines a threaded first end opening 324. The first end 321 of the ram 320 is removably attached to the base 312 by a fastening device such as a threaded screw 325 that extends through the base opening 323 and into the first end opening 324. Referring to FIG. 15, the second end 322 of the ram 320 defines an O-ring receiving cavity 326 having a chamfered edge 328. The O-ring cavity 326 is adapted and sized to receive a particular size O-ring. The second end 322 of the ram 320 further includes a sleeve shoulder 329.

Referring again to FIGS. 14 and 15, the tool 310 includes a sleeve 330 having a first edge 331, a second edge 332 and a sleeve wall 333 extending between the first and second edges. In a preferred embodiment, the sleeve wall 333 has a substantially cylindrical configuration that conforms to the configuration of the second base cavity 318 of the base 312. The sleeve 330 includes an interior surface 334 that has a substantially cylindrical configuration that is adapted and sized to receive the second end 322 of the ram 320. As shown in FIG. 15, the sleeve 330 includes an annular flange 335 that defines a ram opening 336 that is adapted and sized to receive the ram 320. The annular flange includes a ram seat 337 that is adapted and sized to receive the sleeve shoulder 329 of the ram 320. The annular flange 335 further includes a spring seat 338. Referring to FIGS. 14 and 15, the second edge 332 of the sleeve 330 defines an opening 340. A second chamfered edge 342 is defined by the second edge 332 adjacent the opening 340.

Referring to FIG. 15, the tool 310 includes a coiled spring 344 positioned between the first base cavity 317 of the base 312 and the spring seat 338 of the sleeve 330. The spring 344 urges the sleeve 330 away from the base 312. However, the spring 344 can be compressed to allow the sleeve 330 to move toward the base 312. The annular shoulder 319 of the base 312 is adapted and sized to contact the spring seat 338 of the annular flange 335 of the sleeve 330. The sleeve shoulder 329 of the second end 322 of the ram 320 is adapted and sized to contact the ram seat 337 of the annular flange 335 of the sleeve 330. Thus, the annular shoulder 319 and the sleeve shoulder 329 cooperate to limit the travel of the sleeve 330 in the space defined by such shoulders in the second base cavity 318 of the base 312.

Figure 16:
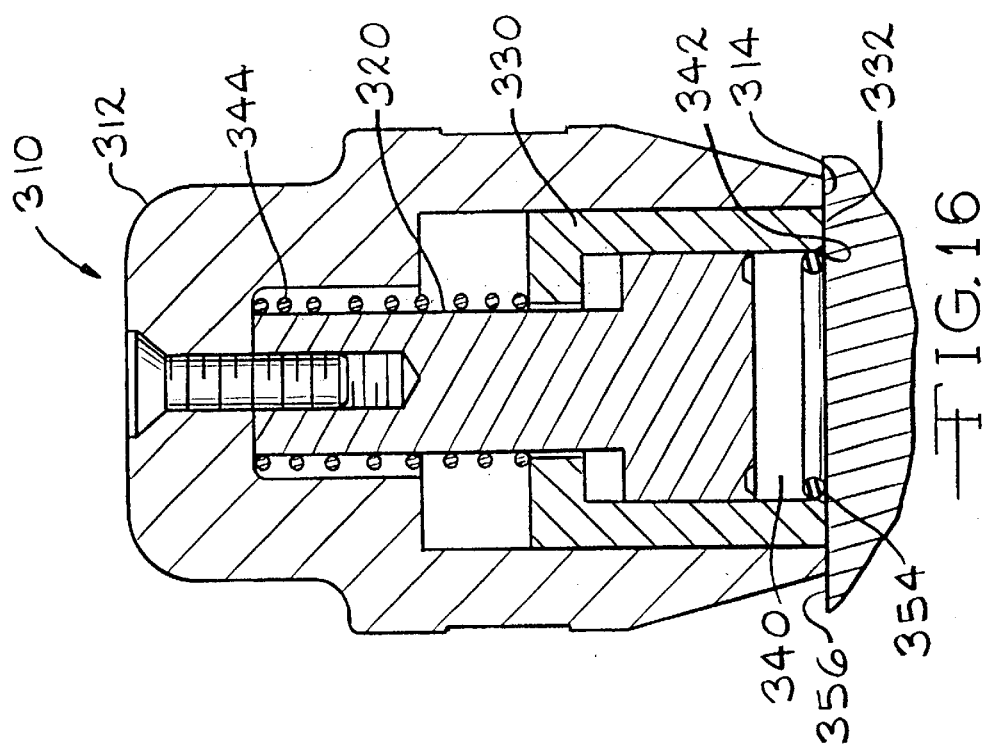
FIG. 16 is a view similar to the view of FIG. 15 showing the tool receiving the O-ring.

Referring to FIGS. 15–21, the operation of the tool 310 will be described. As shown in FIGS. 15 and 16, a flexible O-ring 354 is positioned on a work surface 356. The tool 310 is positioned above the O-ring 354 so that the opening 340 of the second edge 332 of the sleeve 330 is in alignment with the O-ring. The tool 310 is then moved toward the O-ring 354 until the O-ring contacts the second chamfered edge 342 of the second edge 332, which is adapted and sized to snugly engage the flexible O-ring. The tool 310 is moved toward the work surface 356 until the second surface 314 of the base 312 contacts the work surface. The tool 310 is then withdrawn from the work surface 356. Due to the snug engagement between the second edge 332 and the O-ring 354, the tool 310 can lift the O-ring without the O-ring falling out of the opening 340.

Referring to FIGS. 17–20, the second edge 332 of the sleeve 330 is positioned adjacent a connector 360 that defines a half dovetail recess 362 having an inwardly extending lip 364. The O-ring 354 is positioned in the recess 362 by moving the tool 310 toward the connector 360 so that the second edge 332 of the sleeve 330 engages the connector. The O-ring 354 is then positioned adjacent the recess 362. The O-ring 354 is positioned in the recess 362 by engaging the first base surface 313 or the side surface 315 of the base 312 to push the base toward the connector 360. This causes the second end 322 of the ram 320 to push the O-ring 354 into the recess 362. During pushing, the chamfered edge 328 of the ram 320 causes the O-ring 354 to flex inwardly to allow the O-ring to pass the lip 364 as shown in FIG. 19. The tool 310 allows for constant forces to be applied to the O-ring 354 during pushing. These forces allow for the even and complete insertion of the O-ring 354 in the recess 362.

As shown in FIG. 20, after the O-ring 354 has been inserted in the recess 362, the tool 310 is withdrawn from the connector 360.

Figure 22:
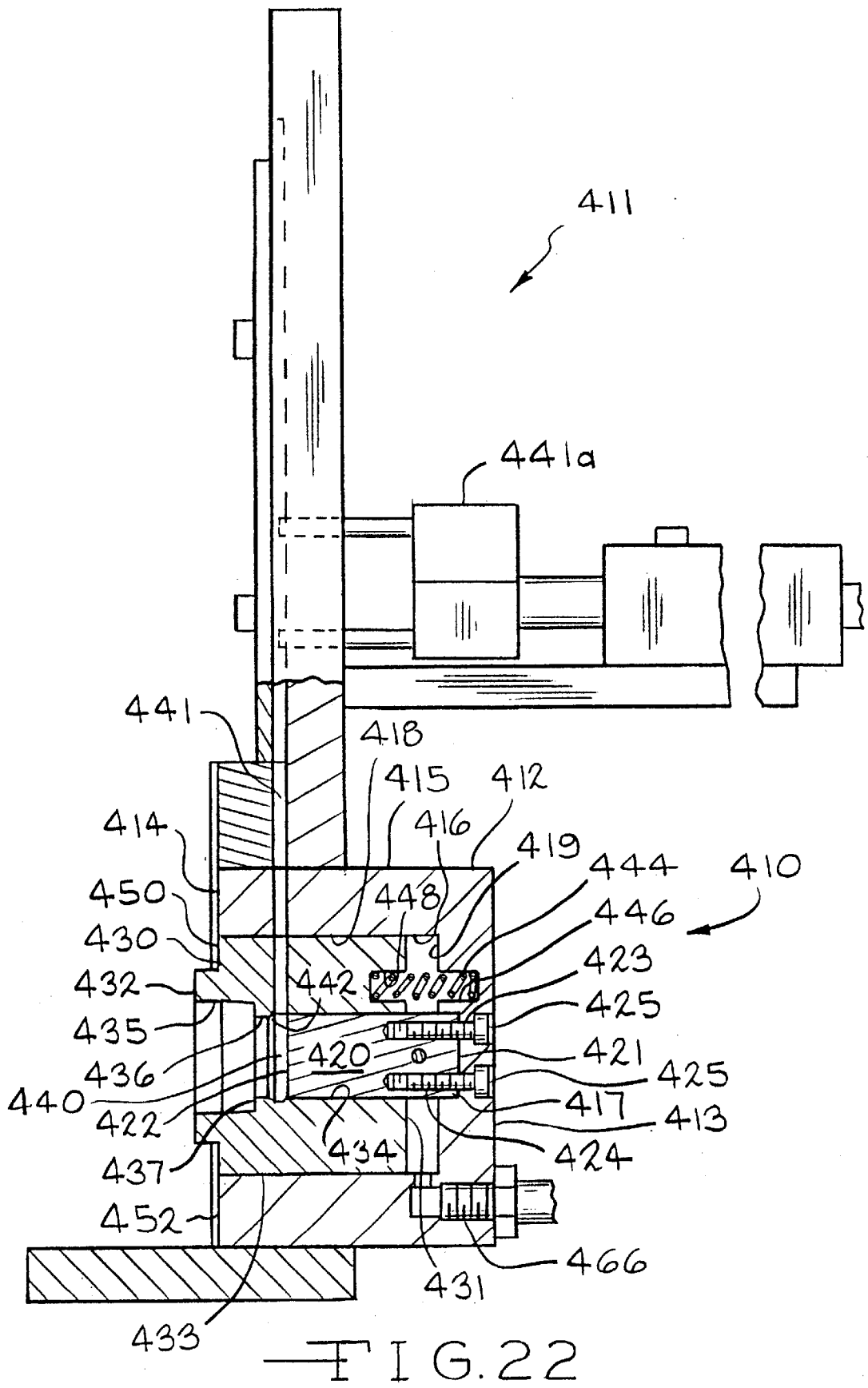
FIG. 22 is a cross-sectional view taken through the center of a fifth embodiment tool according to the present invention.
Figure 23:
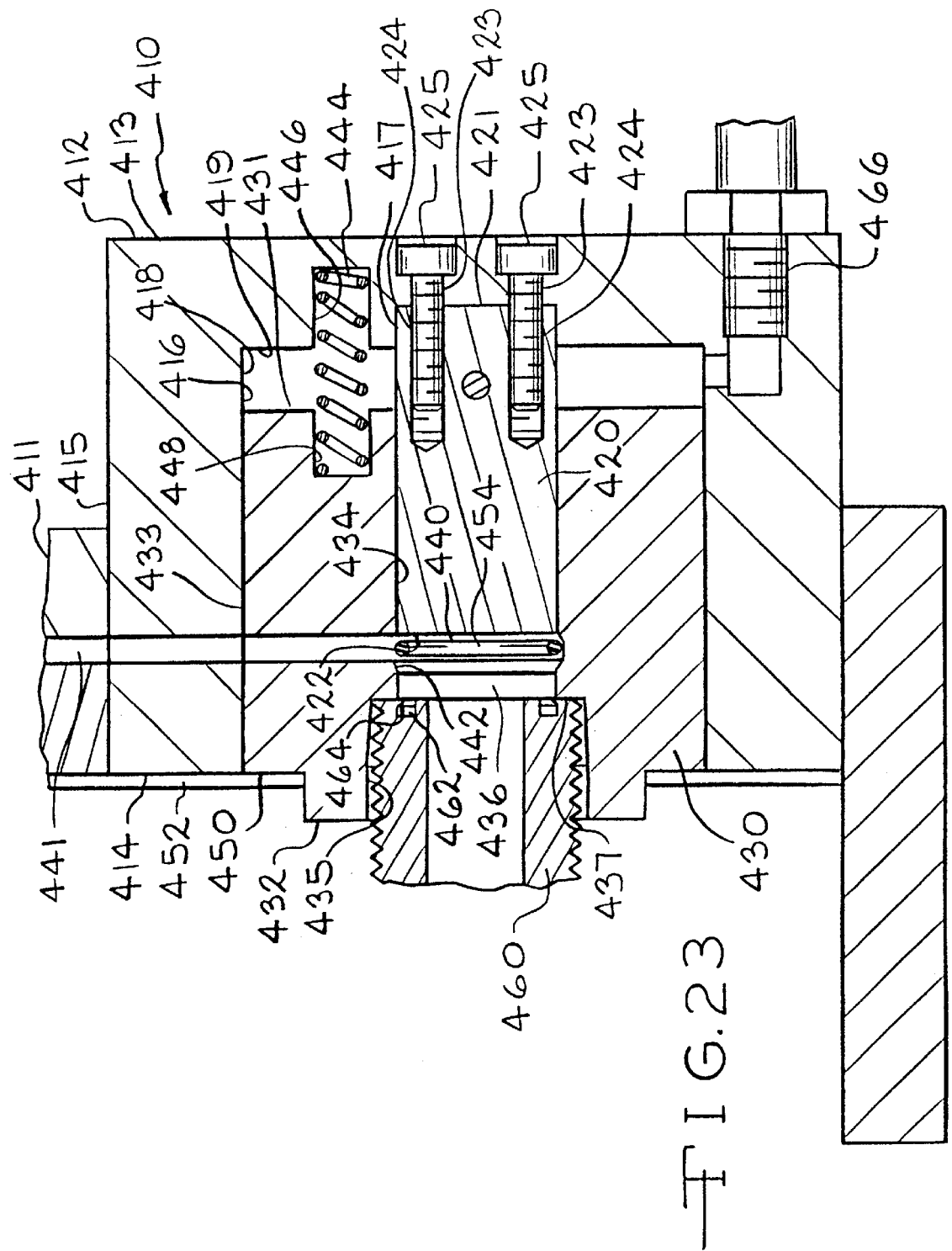
FIG. 23 is a detailed cross-sectional view showing the tool of FIG. 22 positioned adjacent a connector defining a half dovetail recess.
Figure 24:
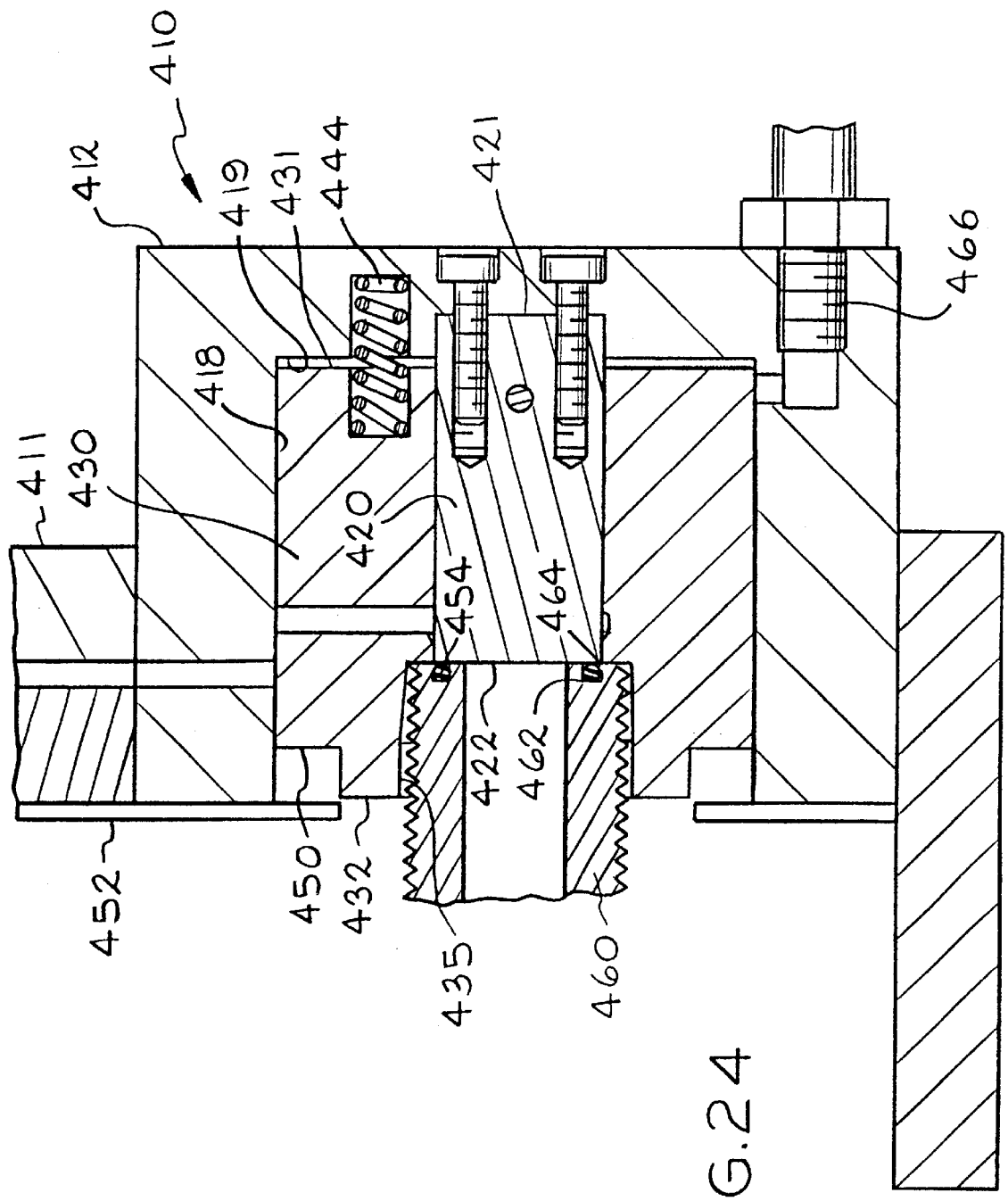
FIG. 24 is a view similar to the view of FIG. 23 showing the tool positioning the O-ring in the recess.

Referring to FIGS. 22–24, a fifth embodiment tool is shown. In the drawings, the fifth embodiment tool is indicated generally by the reference number "410".

Referring to FIGS. 22 and 23, the tool 410 is semi-automatic. The tool 410 can be used with, for example, an O-ring installation machine manufactured by Automated Industrial Systems of Erie, Pennsylvania, which is indicated generally in the drawings by the reference number 411.

Still referring to FIGS. 22 and 23, the tool 410 includes a base 412 having a first surface 413, a second surface 414 and a side surface 415 that extends between the first and second surfaces. The base 412 includes an interior surface 416 that defines a first base cavity 417 and a second base cavity 418. The first and second base cavities 417 and 418 have substantially cylindrical configurations with the second base cavity having a larger diameter than the first base cavity. The interior surface 416 defines an annular shoulder 419 in the second base cavity 418.

As shown in FIGS. 22 and 23, the tool 410 includes a ram 420. In a preferred embodiment, the ram 420 has a substantially cylindrical configuration. The ram 420 includes a first end 421 and second end 422. The base defines two base openings 423 that extend from the first surface 413 to the first base cavity 417. The ram 420 defines two corresponding first end openings 424 at the first end 421. Two threaded screws 425 extend through the base openings 423 into the first end openings 424 to removably attach the ram 420 to the base 412. As shown in FIGS. 22 and 23, the second end 422 of the ram 420 is adapted and sized to engage a particular size O-ring.

Still referring to FIGS. 22 and 23, the tool 410 includes a sleeve 430 including a first edge 431, a second edge 432 and a sleeve wall 433 extending between the first and second edges. In a preferred embodiment, the sleeve wall 433 has a substantially cylindrical configuration. The sleeve 430 includes an interior surface 434 that has a cylindrical configuration that is adapted and sized to receive the ram 420. As shown in FIG. 23, the interior surface 434 of the sleeve 430 defines a connector cavity 435 adjacent the second edge 432. The interior surface 434 further defines an O-ring cavity 436 adjacent the connector cavity 435. Both the connector and O-ring cavities 435 and 436 have substantially cylindrical configurations, with the connector cavity having a larger diameter than the O-ring cavity. The interior surface 434 defines a connector seat 437 that is adapted and sized to receive and engage a particular size connector. The interior surface 434 of the sleeve 430 defines an O-ring slot 440 that is in communication with a chute 441 of the machine 411. As shown in FIG. 22, the chute 441 is in communication with a semi-automatic O-ring feeding device 441a of the machine 411, which provides an O-ring to the chute 441 and thus to the O-ring slot 440. A chamfered edge 442 is defined by the interior surface 434 of the sleeve 430 adjacent the O-ring slot 440.

Referring to FIGS. 22 and 23, the tool 410 includes a coiled spring 444 positioned in a base spring cavity 446 defined by the interior surface 416 of the base 412 and a sleeve spring cavity 448 defined by the first edge 431 of the sleeve 430. The spring 444 urges the sleeve 430 away from the base 412. However, the spring 444 can be compressed to allow the sleeve 430 to move toward the base 412. The sleeve 430 defines an annular sleeve shoulder 450 that receives an annular face plate 452 mounted on the machine 411 adjacent the base 412. The face plate 452, which engages the sleeve shoulder 450, and the annular shoulder 412 of the base 412, which engages the first edge 431 of the sleeve 430, cooperate to limit the travel of the sleeve 430 in the second base cavity 418 of the base 412.

Referring to FIGS. 22–24, the operation of the tool 410 will be described. A flexible O-ring 454 comprised of an elastomeric material is deposited by the machine 411 through the chute 441 into the O-ring slot 440 of the sleeve 430.

As shown in FIGS. 23 and 24, a connector 460 that defines a half dovetail recess 462 having an inwardly extending lip 464 is positioned in the connector cavity 435 of the sleeve 430 until it engages the connector seat 437. The connector 460 is then moved toward the base 412 which causes the sleeve 430 to move in the same direction. During movement, air in the second base cavity 418 is exhausted through valve 466. During movement of the connector 460, the second end 422 of the ram 420 engages the O-ring 454 to cause the O-ring to engage the chamfered edge 442 causing the O-ring to flex inwardly while it enters the O-ring cavity 436. In the O-ring cavity 436, the O-ring is properly aligned with the recess 462 of the connector 460. The ram 420 then pushes the O-ring 454 past the lip 464 of the recess 462. The tool 410 allows for constant forces to be applied to the O-ring 454 to provide for the even and complete insertion of the O-ring in the recess 462 as shown in FIG. 24. After the O-ring 454 has been inserted in the recess 462, the connector 460 is withdrawn from the connector cavity 435. The above-described operation can then be quickly and efficiently repeated.

The above detailed description of the present invention is given for explanatory purposes. It will be apparent to those skilled in the art that numerous changes and modifications can be made without departing from the scope of the following claims.

I claim:

1. A tool for inserting a flexible O-ring in a connector having a recess including a lip, comprising:
    a base defining at least one base cavity;
    a ram mounted on said base in said base cavity, said ram having an end adapted to engage said O-ring;
    a sleeve movably mounted in said base cavity adjacent said ram, said sleeve defining an O-ring slot for receiving and positioning said O-ring adjacent said ram, said sleeve further defining an opening having a chamfered edge adjacent said O-ring slot, whereby said connector is positioned adjacent said opening, said sleeve is moved with respect to said ram, said ram pushes said O-ring toward said recess, said chamfered edge and said opening engage said O-ring to cause said O-ring to flex inwardly during pushing by said ram to allow said O-ring to pass said lip and enter said recess.

2. The tool of claim 1, wherein said tool is adjacent a machine having means for delivering an O-ring to said O-ring slot.

3. The tool of claim 1, wherein said sleeve defines a connector opening having a connector shoulder adjacent said opening.

4. The tool of claim 1, wherein said tool further includes a coiled spring positioned between said base and said sleeve for urging said sleeve away from said base.

* * * * *